United States Patent
Levine et al.

(10) Patent No.: US 11,554,876 B2
(45) Date of Patent: Jan. 17, 2023

(54) SINGLE PIECE VENT DAM

(71) Applicant: The Boeing Company, Chicago, IL (US)

(72) Inventors: Daniel M. Levine, Seattle, WA (US); Gregory J. Vering, Kirkland, WA (US); Eduard Oyzerskiy, Sandy, UT (US); Hyukbong Kwon, Marysville, WA (US)

(73) Assignee: The Boeing Company, Chicago, IL (US)

(*) Notice: Subject to any disclaimer, the term of this patent is extended or adjusted under 35 U.S.C. 154(b) by 166 days.

(21) Appl. No.: 16/824,479

(22) Filed: Mar. 19, 2020

(65) Prior Publication Data
US 2021/0291998 A1  Sep. 23, 2021

(51) Int. Cl.
*B64D 37/10* (2006.01)
*B64C 3/18* (2006.01)
*B64C 3/34* (2006.01)

(52) U.S. Cl.
CPC ............ *B64D 37/10* (2013.01); *B64C 3/182* (2013.01); *B64C 3/34* (2013.01)

(58) Field of Classification Search
CPC ........ B64D 37/10; B64D 37/06; B64D 37/08; B64D 37/14; B64D 37/16; B64D 37/20; B64D 37/22; B64D 37/24; B64D 37/26; B64D 37/28; B64C 3/34; B64C 3/182
See application file for complete search history.

(56) References Cited

U.S. PATENT DOCUMENTS

| | | | |
|---|---|---|---|
| 9,010,689 B1* | 4/2015 | Brook | B64D 37/32 244/135 R |
| 9,382,014 B2 | 7/2016 | Brook et al. | |
| 9,399,510 B2* | 7/2016 | Rolfes | B64D 37/04 |
| 10,023,321 B1* | 7/2018 | Oyzerskiy | B64C 3/182 |
| 2016/0355273 A1* | 12/2016 | Perez Diaz | B64C 3/34 |
| 2019/0315492 A1* | 10/2019 | Stouffer | B64F 5/30 |

FOREIGN PATENT DOCUMENTS

| | | | | |
|---|---|---|---|---|
| EP | 3656657 A1 * | 5/2020 | ............ | B64C 3/187 |
| GB | 2575102 A * | 1/2020 | .......... | B29C 70/446 |
| JP | 2016043923 A | 4/2016 | | |
| JP | 2020011682 A * | 1/2020 | ............... | B64C 3/34 |
| KR | 100718572 B1 | 5/2007 | | |
| KR | 101191394 B1 | 10/2012 | | |

* cited by examiner

*Primary Examiner* — Philip J Bonzell
*Assistant Examiner* — Ryan Andrew Yankey
(74) *Attorney, Agent, or Firm* — Felix L. Fischer

(57) ABSTRACT

A dam for use with a duct having a longitudinal axis. The dam employs a single piece insert having a first lateral flange and a second lateral flange configured to engage opposing interior lateral surfaces of the duct. The insert engages the duct in sealing contact in a seated position. The first and second lateral flanges are offset longitudinally along the longitudinal axis and joined with a curved wall having a curvature shaped to be received, with the insert oriented at an insert angle about a normal axis perpendicular to the longitudinal axis, in an aperture in the duct.

20 Claims, 15 Drawing Sheets

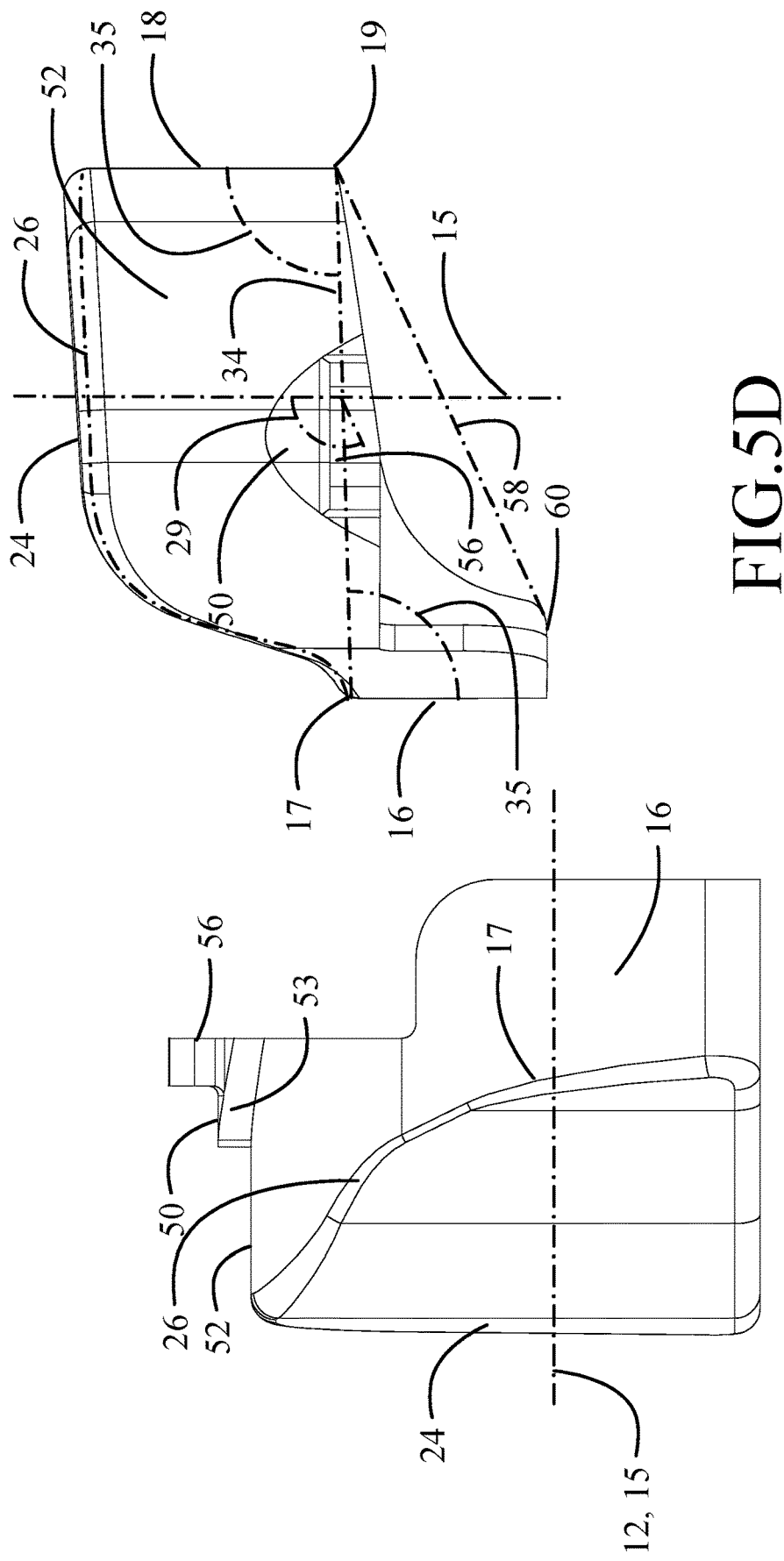

SINGLE PIECE VENT DAM

BACKGROUND INFORMATION

Field

Embodiments of the disclosure relate generally to venting systems for aircraft structural ducts and more particularly to a single piece dam for rotated installation through an aperture in a vent stringer.

BACKGROUND

Aircraft structures employ stringers as stiffening elements for skin panels and other integrated structural elements. Stringers increase the bending strength of a panel and may extend for significant runs along interior panel surfaces. Stringers may have various cross sections but may have a hat section which provides an interior duct or channel. This duct may be employed for secondary purposes such as using the stringer as a conduit for venting fuel and fuel vapors from wing fuel tanks and surge tanks. This approach is particularly applicable for a fuel tank cross-venting system. The duct must be dammed at fuel tank boundaries to separate the tanks and at interfaces with other system tubes to direct the vent airflow.

In composite construction, stringers are typically bonded to the skin or other panel with flanges extending from a base portion of the hat section. To accommodate venting, one or more apertures are formed in the hat section to direct the fuel or fuel vapors out of and into desired fuel transfer conduits or tanks. To seal the stringer at the aperture to prevent fuel or vapors from continuing through the stringer beyond the apertures, vent dams in the stringer are required. Fabrication techniques for the bonded stringers typically require that the vent dam be inserted into the stringer after bonding to the skin. The size and shape of the apertures is desirably minimized to maintain structural strength of the stringer and avoid stress risers. A cap may be installed over the aperture with fittings to engage the fuel/vent conduit. The attaching conduit is typically substantially orthogonal to the stringer duct and reduction of turbulence and pressure drop in fuel flowing into or out of the stringer is also desirable.

Inserting the vent dam through the aperture and then sealing the dam can be challenging to provide the desired change in flow direction of the fuel or vapor. Multi-piece dams have been employed to allow a collapsed or piecemeal insertion through the aperture and assembly inside the stringer duct. However, such dams require joining fasteners and create added complexity and parts count. Additionally, such joining fasteners may require electrical grounding further increasing fabrication complexity.

SUMMARY

Exemplary implementations provide a dam for use with a duct having a longitudinal axis. The dam employs a single piece insert having a first lateral flange and a second lateral flange configured to engage opposing interior lateral surfaces of the duct. The insert engages the duct in sealing contact in a seated position. The first and second lateral flanges are offset longitudinally along the longitudinal axis and joined with a curved wall having a curvature shaped to be received, with the insert oriented at an insert angle about a normal axis perpendicular to the longitudinal axis, in an aperture in the duct.

The exemplary implementations provide a method of sealing a vent stringer. A vent dam insert is rotated to an insertion angle and inserted into an aperture in a vent stringer. The vent dam insert is rotated to align an insert axis with a longitudinal axis of the vent stringer. The vent dam insert is translated longitudinally along the longitudinal axis into a seated position.

BRIEF DESCRIPTION OF THE DRAWINGS

The features, functions, and advantages that have been discussed can be achieved independently in various implementations of the present disclosure or may be combined in yet other implementations, further details of which can be seen with reference to the following description and drawings.

FIGS. 5A-5D are end, left and right side, and top view of the vent dam insert;

DETAILED DESCRIPTION

The implementations and methods described herein provide a single piece vent dam insert sized to be received into an aperture in a stringer. The vent dam insert has lateral flanges which are offset along a longitudinal axis of the stringer when in the seated condition. The offset of the lateral flanges provides a reduced dimension orthogonal to a lateral hypotenuse of the trailing edge of the first lateral flange and a leading edge of the second lateral flange allowing the insert to be rotated from a final sealed orientation and received through the aperture.

Figure 1:
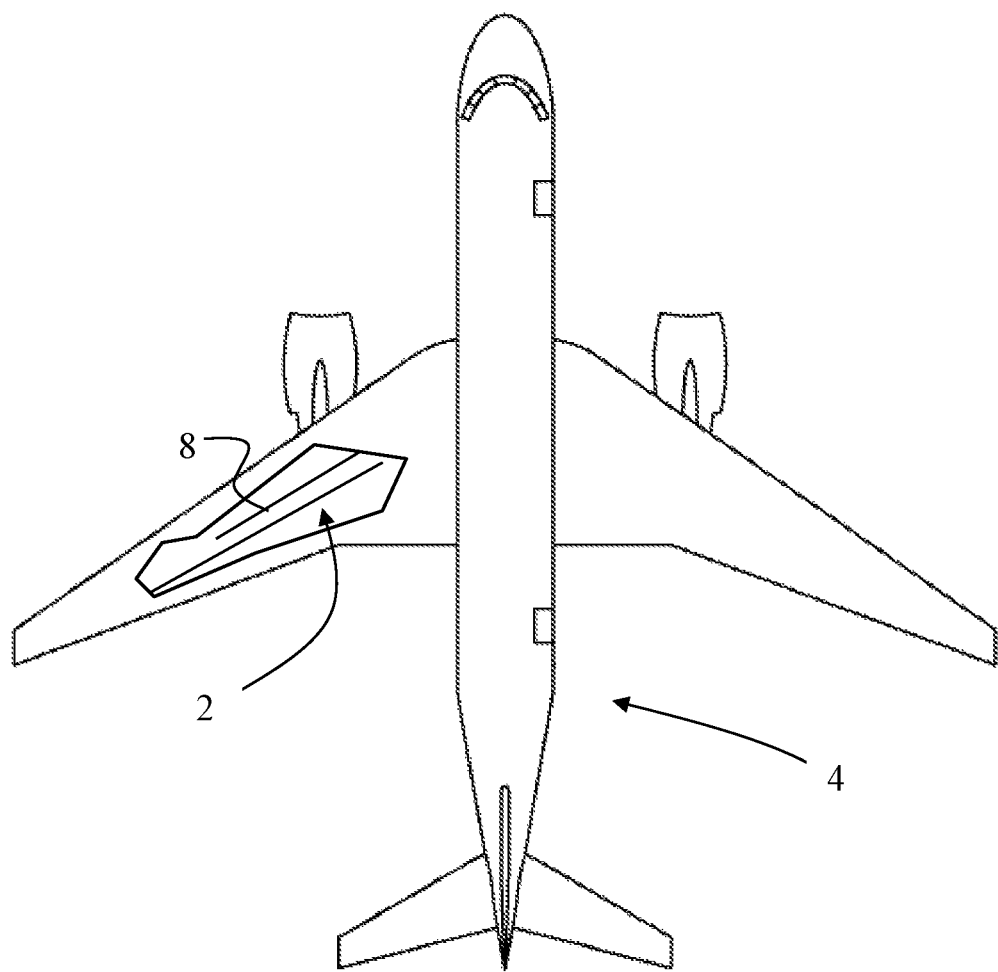
FIG. 1 is a pictorial representation of an aircraft with a vent system employing vent stringers.
Figure 2A:
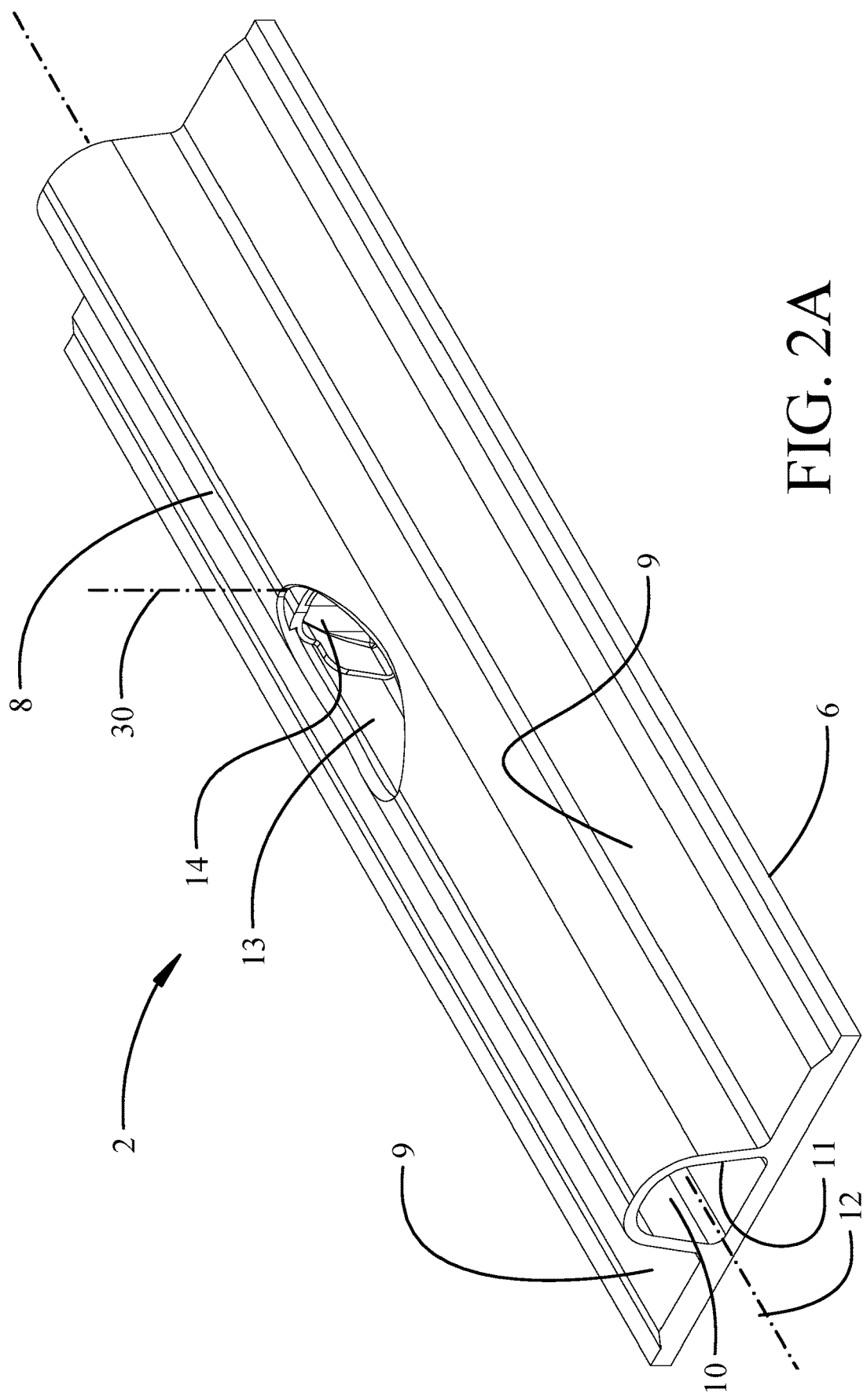
FIG. 2A is a detailed pictorial representation of a vent stringer employing an implementation of the vent dam insert.
Figure 2B:
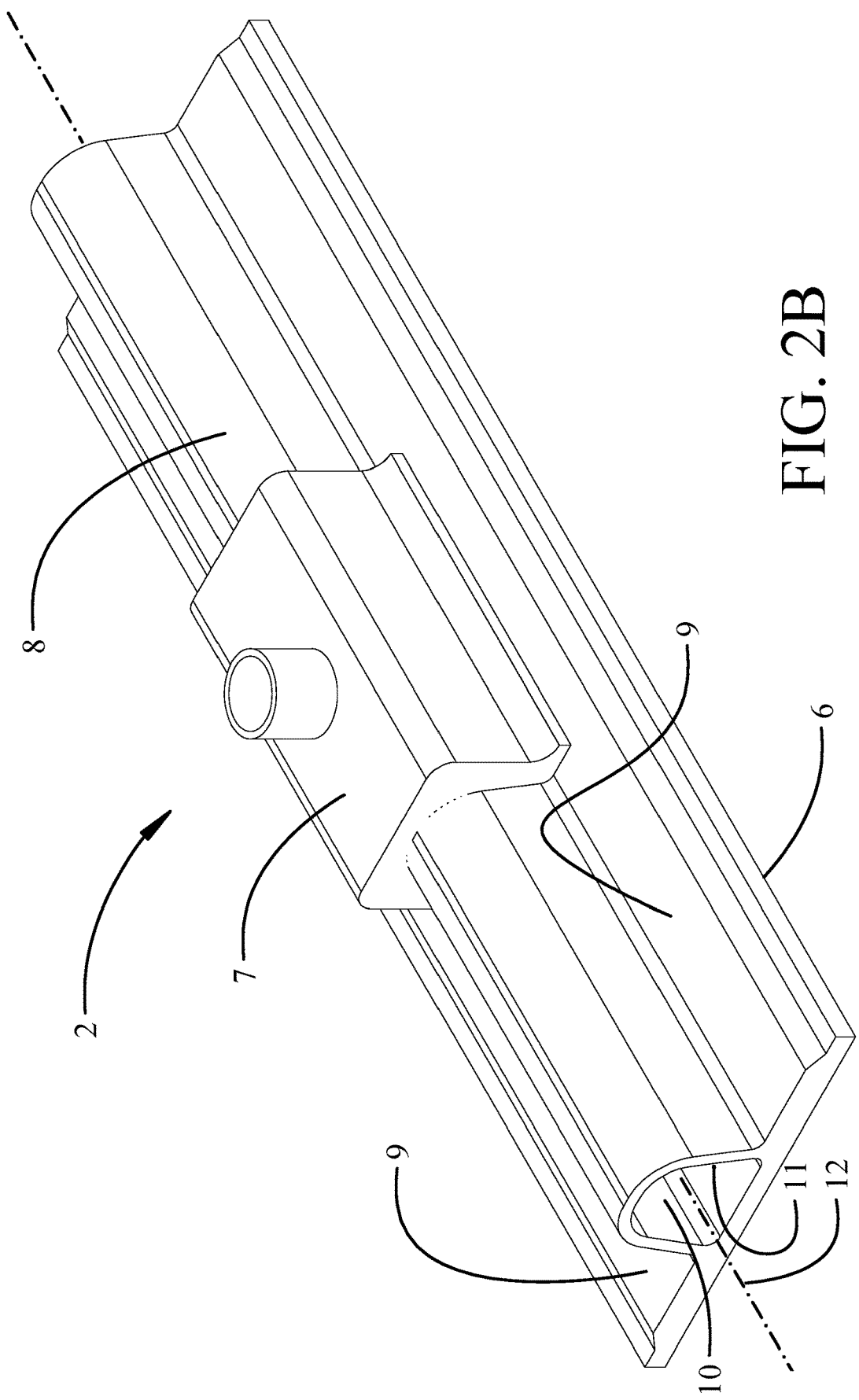
FIG. 2B is a pictorial representation of the vent stringer with a conduit connection cap attached over the aperture in the vent stringer.

Referring to the drawings, FIG. 1 shows a fuel vent system 2 for an aircraft 4. As seen in FIGS. 2A and 2B, the fuel vent system 2 includes a vent stringer 8. The vent stringer 8 has a duct 10 with a curved trapezoidal cross section forming an internal periphery 11 and a longitudinal axis 12. A normal axis 30 is perpendicular to the longitudinal axis 12. An aperture 13 is defined through the vent stringer 8 and, in some implementations, is an oval in shape. A single piece insert 14 is received in the duct 10 as a vent dam.

Referring to FIG. 3-5A, the single piece insert 14 has a first lateral flange 16 and a second lateral flange 18. The duct 10 has opposing first and second interior lateral surfaces 20, 22 as a portion of the internal periphery 11. The first lateral flange 16 and the second lateral flange 18 are configured to engage the first and second interior lateral surfaces 20, 22 of the duct 10 with an insert axis 15 aligned with the longitudinal axis 12 in a seated position. The first and second lateral flanges are offset longitudinally along the insert axis and joined with a curved wall 24 having a curvature 26. The curvature 26 is shaped to be received, with the insert oriented in a rotated position at an insertion angle 28 rotated about the normal axis 30 perpendicular to the longitudinal axis, in the aperture 13 in the vent stringer 8.

Referring again to FIG. 2A, an aircraft skin 6 can include the vent stringer 8. The implementation in the example shown is a composite multilayer laminated structure which employs webs 9 extending laterally from the vent stringer 8 providing a base laminated onto the skin 6. The vent stringer 8 acts as a structural element resisting bending loads in the skin 6. However, the vent stringer 8 additionally provides the interior duct 10 which may be employed, as in the implementations disclosed herein, in a fuel vent system for transfer of fuel or fuel vapor between fuel conduits or tanks, such as surge tanks. As seen in FIG. 2B, a cap 7, extending over the stringer 8 to cover the aperture 13 and sealed to the stringer and webs 9, may be employed for interconnection to other conduits. The vent dam insert 14 (visible in FIG. 2A) is placed in the duct 10 to seal the duct diverting flow from the duct 10 into the cap 7 and any connected conduit or plumbing for routing elsewhere in the aircraft structure.

Figure 3:
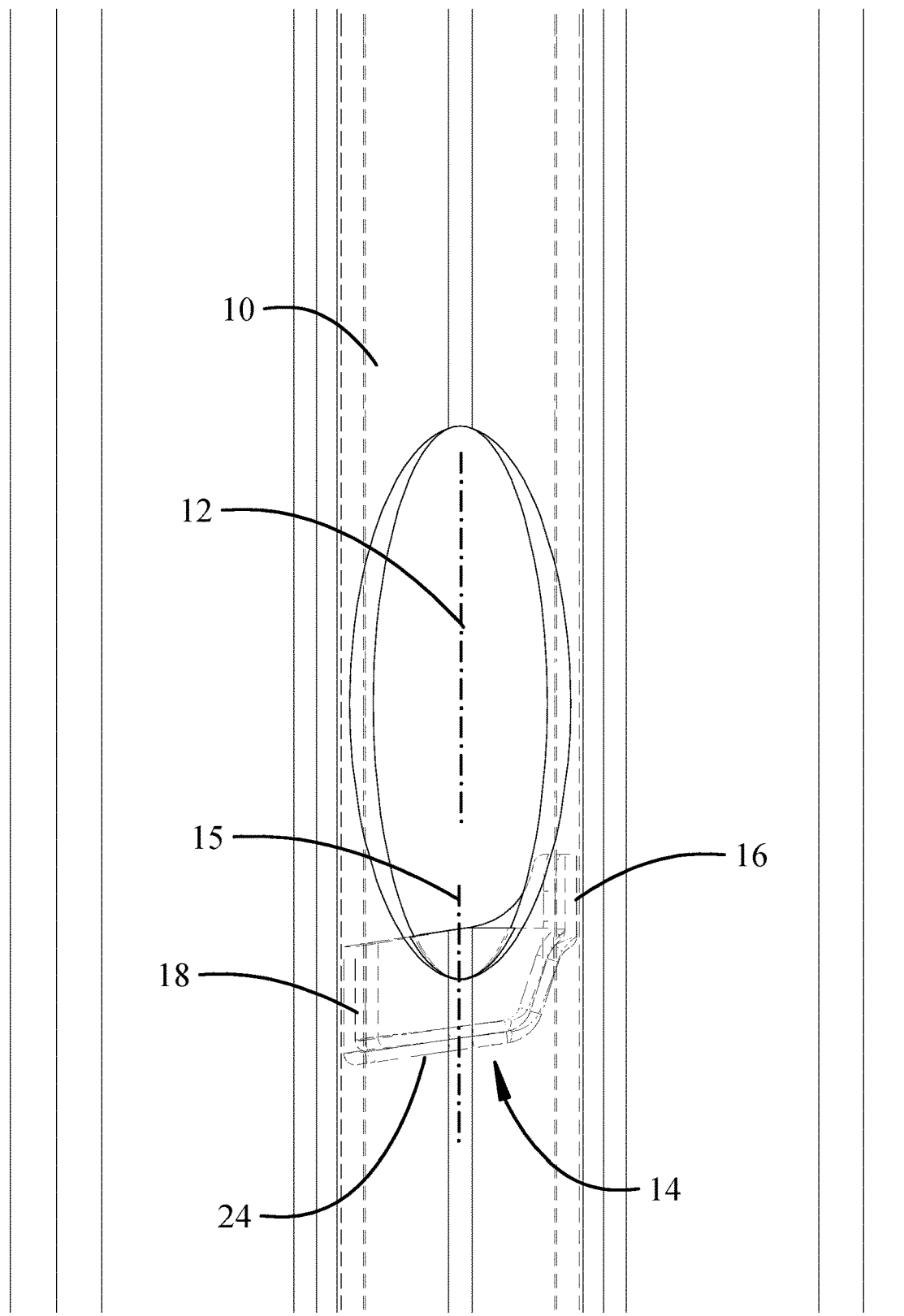
FIG. 3 is top hidden line view of the vent dam insert in the seated position in the duct of the vent stringer.
Figure 4:
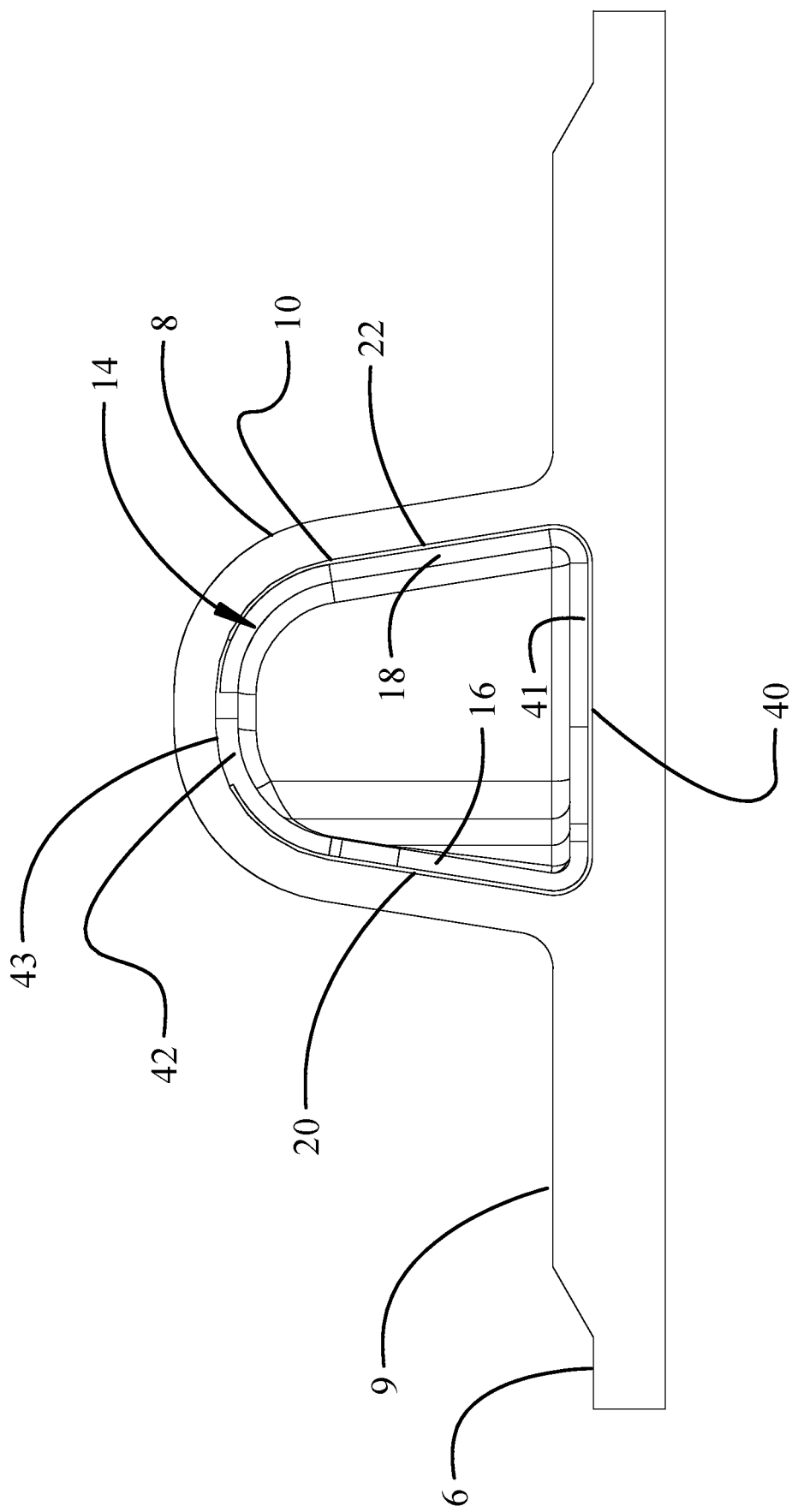
FIG. 4 is a section view of the vent stringer showing the vent dam insert engagement.

As seen in FIGS. 3 and 4, the single piece insert 14 has a first lateral flange 16 and a second lateral flange 18. The first lateral flange 16 and the second lateral flange 18 are configured to engage the opposing interior lateral surfaces 20, 22 of the duct 10. The insert 14 engages the internal periphery 11 of the duct 10 in the vent stringer 8 in sealing contact in a seated position. The first and second lateral flanges 16, 18 are offset longitudinally along the longitudinal axis 12 of the duct 10 and a coaxial longitudinal axis 15 of the insert 14 and are joined with a curved wall 24. The wall 24 has a curvature 26 discussed in greater detail subsequently.

For the example implementation shown in FIGS. 5A-5D, the insert 14 has a trailing edge 17 of the first lateral flange 16 and a leading edge 19 of the second lateral flange 18 which are oriented on a lateral hypotenuse 34 perpendicular to the normal axis 30. The offset of the first and second lateral flanges 16, 18 and the curvature 26 of the wall 24 are configured to allow the insert 14 to be rotated to an insertion angle 28 as shown in FIG. 6A and inserted into the aperture 13. This allows the aperture 13 to have a minimized minor axis perpendicular to the longitudinal axis 12. The hypotenuse 34 has a relative angle 35 with respect to the first and second lateral flanges 16, 18 of not less than 90°.

The component of the hypotenuse 34 perpendicular to the longitudinal axis 15 of the insert has a planar length 36 less than a planar width 38 between the opposing interior lateral surfaces at the aperture as represented in FIG. 6A. The planar length 36 of the perpendicular component of hypotenuse 34 is less than the planar width 38 of the opposing interior lateral surfaces of the duct at all incremental lengths perpendicular to normal axis 30 as the lengths of planar length 36 and planar width 38 will vary along normal axis 30.

Figure 6A:
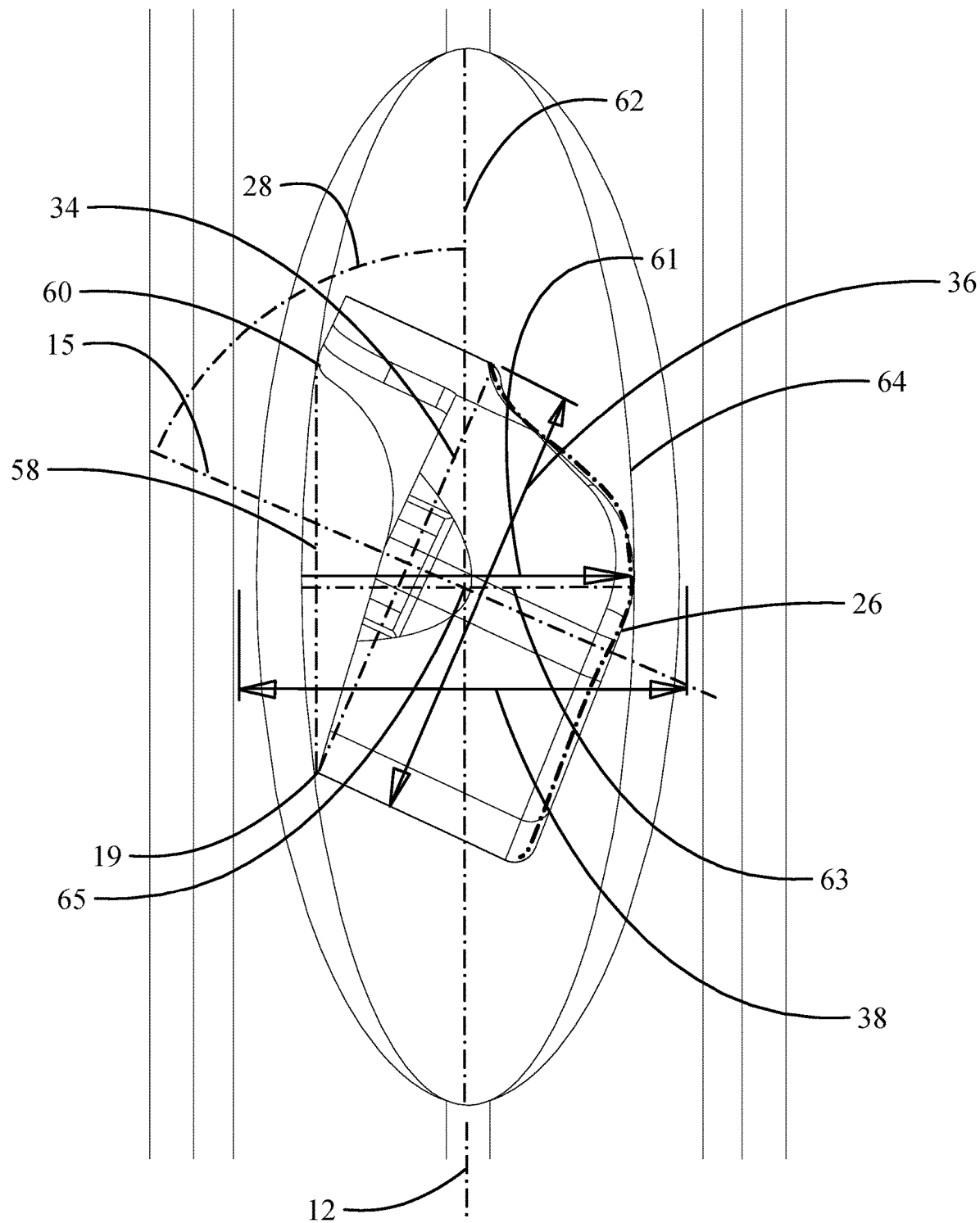
FIG. 6A is a detailed top view of the vent stringer aperture with the vent dam insert rotated for insertion into the aperture.
Figure 6B:
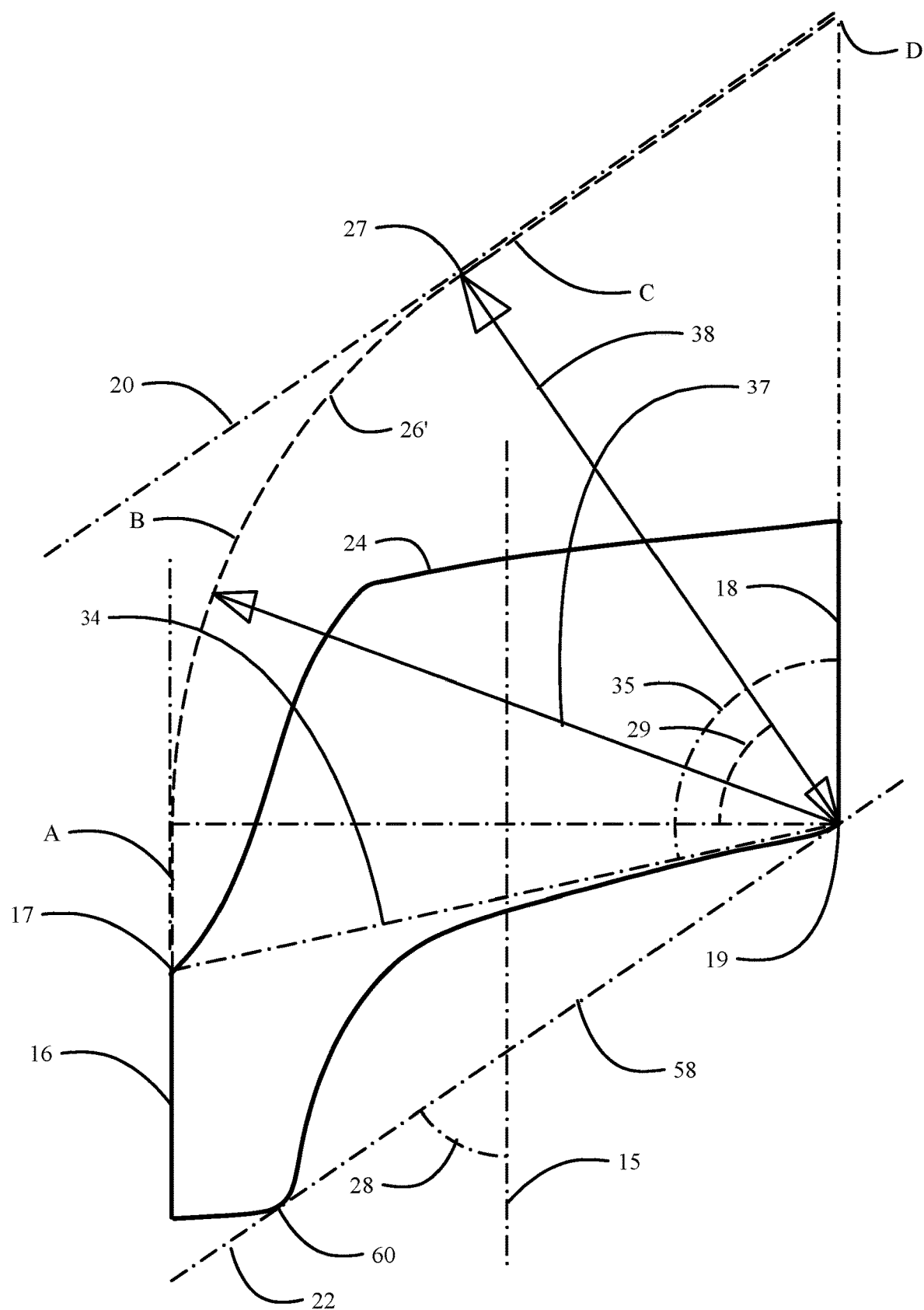
FIG. 6B is an elongated schematic representation of the vent dam insert demonstrating dimensional relationships and geometric limitations of the elements of the vent dam insert.

The curvature 26, which may have varying shapes as subsequently described, is limited as shown in FIG. 6B as curvature 26'. Curvature 26' may be composed of three segments limited in extent to be received within the duct 10. A first segment A cannot exceed an extrapolation of the first lateral flange 16 beyond trailing edge 17 to a tangent of a second segment B limited by a semicircle of radius 37 equal to or less than planar width 38 and commencing perpendicular to the longitudinal axis 15. The semicircle of segment B extends over an arc 29 equal to or greater than the insertion angle 28. For the implementation shown, the arc 29 has a termination at a tangent point 27 on the first interior lateral surface 20. A third segment C extends from the termination of segment B at arc 29 to an extrapolation of the second lateral flange 18 to an intersection point D. Segment C may be parallel to the first lateral interior surface 20 of the duct 10 (seen in FIG. 4).

Figures 5A, 5B:
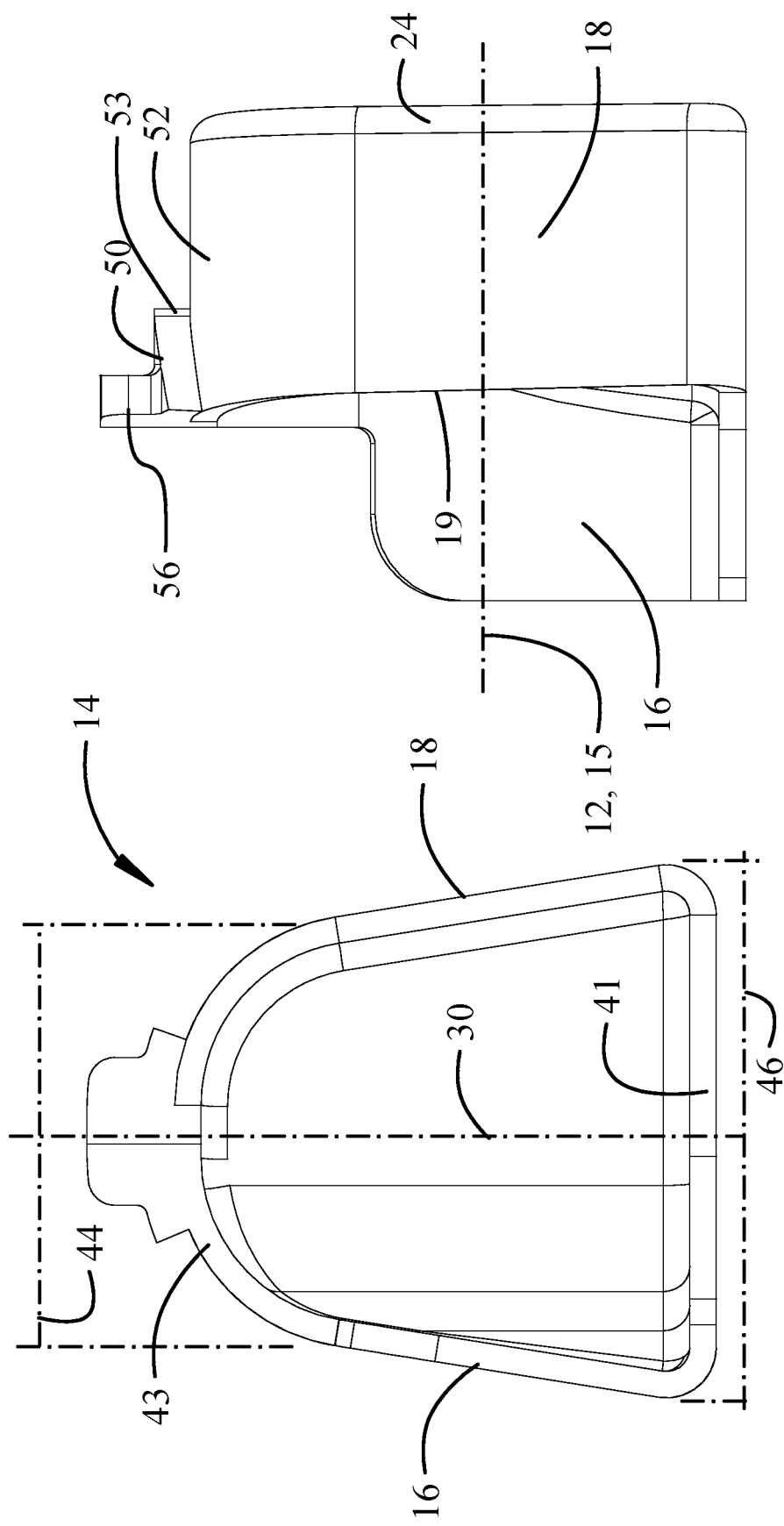

As seen in FIGS. 4 and 5A for the example implementation, the duct 10 of the vent stringer 8 has an arcuate trapezoidal cross section having an arcuate top with a substantially flat bottom 40 in the duct 10. Alternative geometric shapes for the stringer and duct may be employed with flat or curved surfaces. The insert is also substantially trapezoidal in cross section with the first and second lateral flanges 16, 18 of the insert 14 extending from a flat base 41 received on the flat bottom 40 of the duct 10 to a curved top 42 received in an arch 43 forming the arcuate top of the duct 10. For the example implementation, the curved top 42 (and arch 43) have a chord length 44 shorter than a bottom width 46. The first and second lateral flanges 16, 18 are received in sealing engagement with the interior lateral surfaces 20, 22 of the duct and the insert 14 as whole when seated may provide sealing contact with the internal periphery 11 created by the opposing internal lateral surfaces 20, 22, flat bottom 40, and arch 43.

Referring in particular to FIGS. 5D and 6A, to accommodate insertion of the vent dam insert 14 into the aperture 13, a perpendicular distance from a connecting line 58, which extends from the leading edge 19 of the second lateral flange to a forward termination 60 of the first lateral flange, to the curvature 26 of the curved wall 24 is less than a clearing distance 61 (denoted generally in FIG. 5D as an arrow perpendicular with respect to a major axis 62 of the aperture) to a peripheral edge 64 of the aperture along the entire length of connecting line 58 with the normal axis 30 of the insert 14 substantially at a center 65 of the aperture. The major axis 62 of the aperture is parallel to the duct longitudinal axis 12. Within that clearing distance 61, the curvature 26 may be shaped to accommodate flow requirements and may be a simple symmetrical arc or a complex or asymmetric curve. When oriented in a rotated position at the insertion angle 28, the insert 14 can be received into the aperture 13. Shaping of the insert 14 with the hypotenuse of the lateral flanges and curvature of the wall to be received within the clearing distance 61 also allows the aperture to be formed with a minor axis 63 less than the bottom width 46 of the duct.

Figure 7:
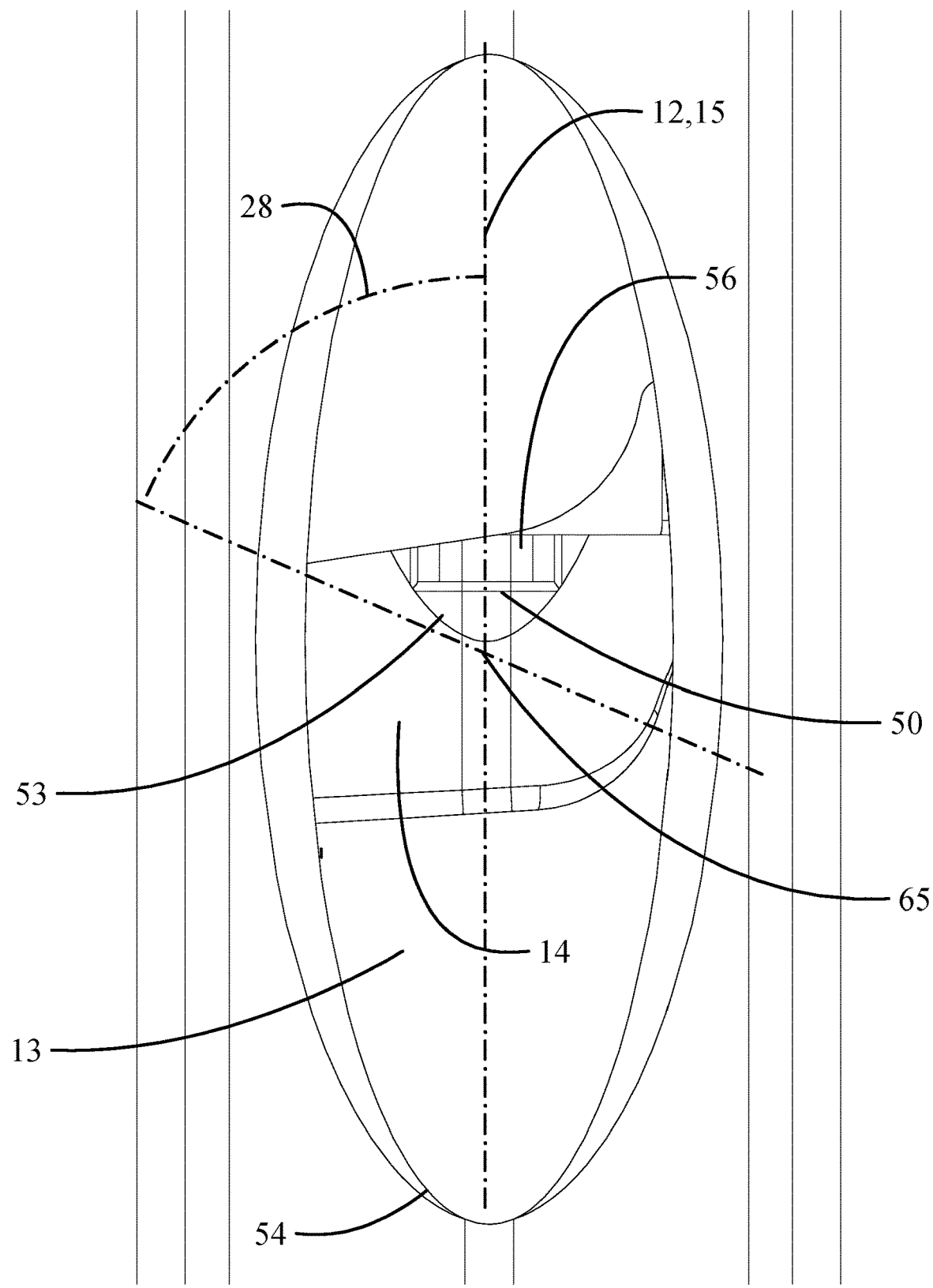
FIG. 7 is a detailed top view of the vent stringer aperture with the vent dam insert counter-rotated into alignment with the longitudinal axis of the duct.
Figure 8:
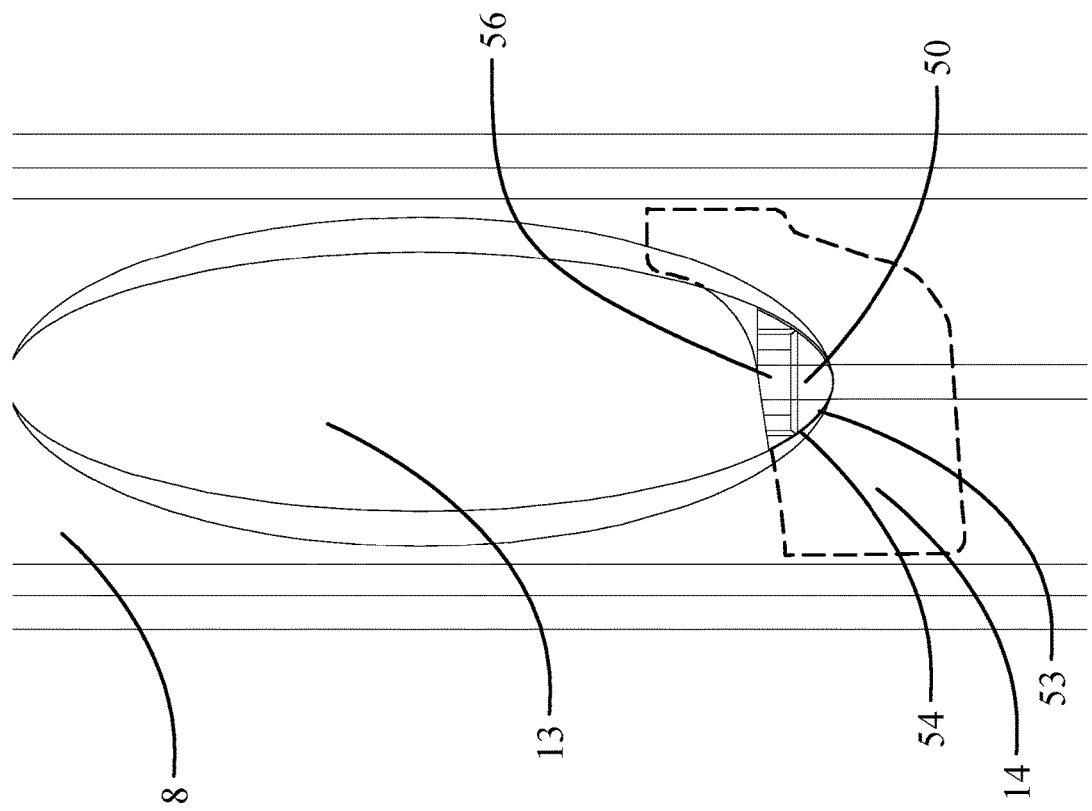
FIG. 8 is detailed top view of the vent stringer aperture with the vent dam insert translated into the seated position.

Once inserted into the aperture 13 with the base 41 against the bottom 40 of the duct, the insert 14 is counter rotated about the normal axis 30 through the insertion angle 28 to align the insert longitudinal axis 15 of the duct longitudinal axis 12 as seen in FIG. 7. The asymmetric shape of the curvature 26 in the example implementation provides additional relief to avoid interference during rotation of the insert 14 and provide clearance for fastener installation, as will be described subsequently. The insert 14 is then translated to an engaged position proximate an end of the aperture 13 as seen in FIG. 8. A cross sectional periphery of the insert is in sealing contact with an internal surface of the duct in the seated position as seen in FIG. 4.

To properly position the vent dam insert 14 with regard to the aperture to achieve desired performance with respect to diverting flow into the cap 7, a positioning ledge 50 extending from a top surface 52 of the curved top 42 of the insert 14, best seen in FIGS. 5B through 5D, engages the arch 43 of the duct 10 with an edge 53 configured to engage an end periphery 54 of the aperture 13 as seen in FIG. 8. Positioning ledge 50 additionally prevents the insert 14 from being pushed too far into the duct 10 beyond the aperture 13 to avoid difficulty in bringing the insert back towards the aperture. Additionally, mating shaping of the edge 53 and end periphery 54 of the aperture also forces the insert longitudinal axis 15 to be aligned with duct longitudinal axis 12. The combined curvatures of the edge 53 and end periphery 54 control 3 degrees of freedom for rotational and longitudinal orientation of the insert in the duct. To assist in translating the insert 14 a tab 56 extends from the positioning ledge 50 which may be grasped to assist in moving the insert. The tab 56 may additionally be employed as an index received in a mating recess in the cap 7 to assist in positioning the cap over the aperture 13. The positioning ledge 50 and tab 56 assist in the installation of the insert 14 but may be eliminated in alternative implementations.

Figure 9:
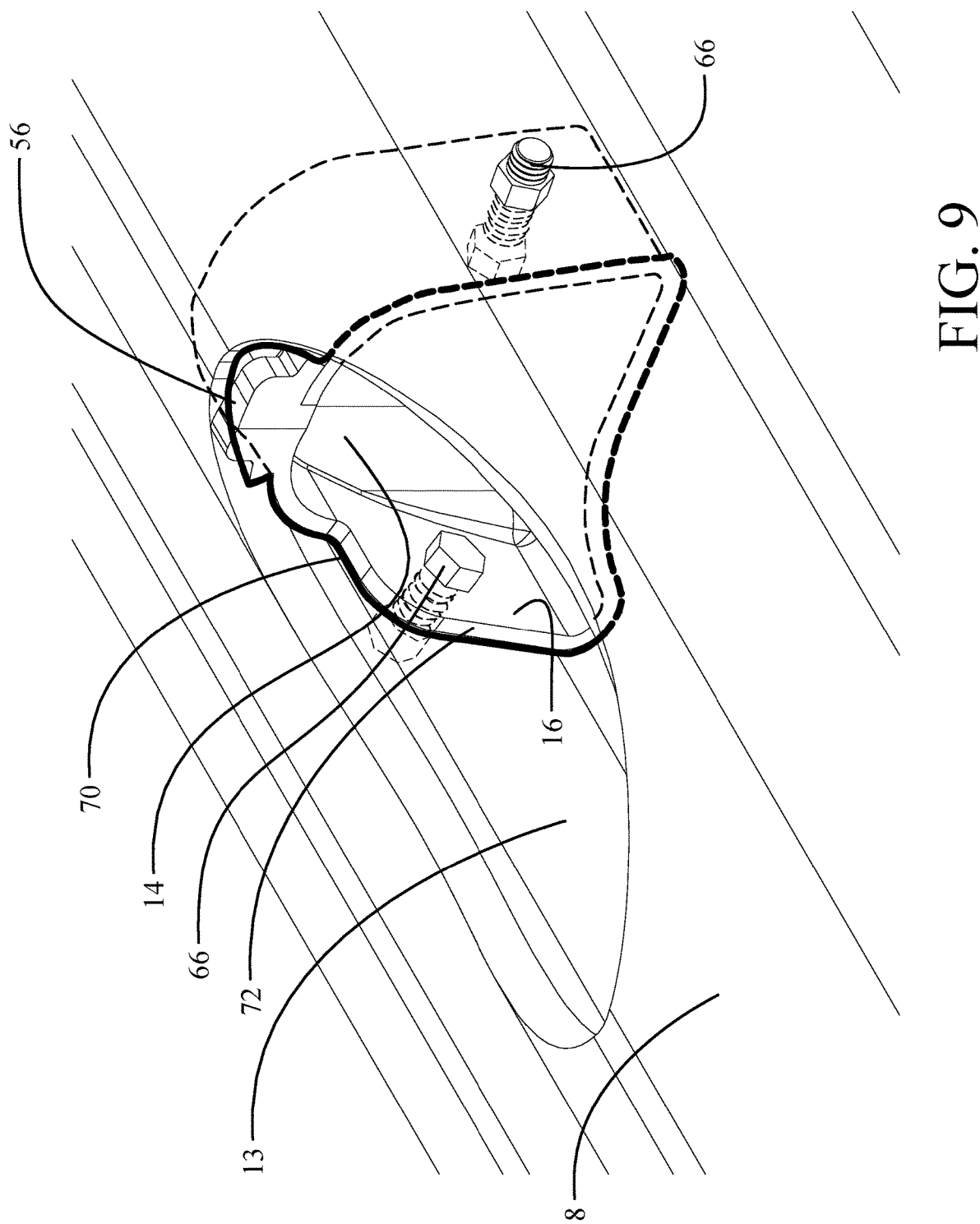
FIG. 9 is a pictorial hidden line representation of the vent stringer with the seated vent dam insert showing the fillet seal.

In the example implementation, fasteners 66 are employed as seen in FIG. 9 to secure the insert 14 in the seated position in the duct 10. A first fastener in inserted through the first offset flange 16 into a first of the opposing lateral interior surfaces 20 of the duct 10 and a second fastener is inserted through the second offset flange 18 into the second of the opposing lateral surfaces 22. The offset flanges 16, 18 allow enhanced access for insertion of the fasteners. Additionally, the complex asymmetric curvature 26 of the wall 24 allows additional clearance for access. In example implementations the fasteners may be protruding head, sleeved fasteners. While one fastener in each of the first and second lateral flanges is shown in the example implementation, multiple fasteners may be employed with vertical and/or longitudinal spacing. In alternative implementations adhesive bonding of the insert 14 in the duct 10 may alleviate the need for any additional mechanical fasteners.

To assure a seal of the insert 14 in the duct 10, a fillet seal 70 is applied around a forward peripheral edge 72 of the insert 14 as seen in FIG. 9. The fillet seal 70 such as a urethane or silicon seal is applied in a liquid or malleable form and then cured. In exemplary implementations a polysulfide sealant may be employed.

Figure 10A:
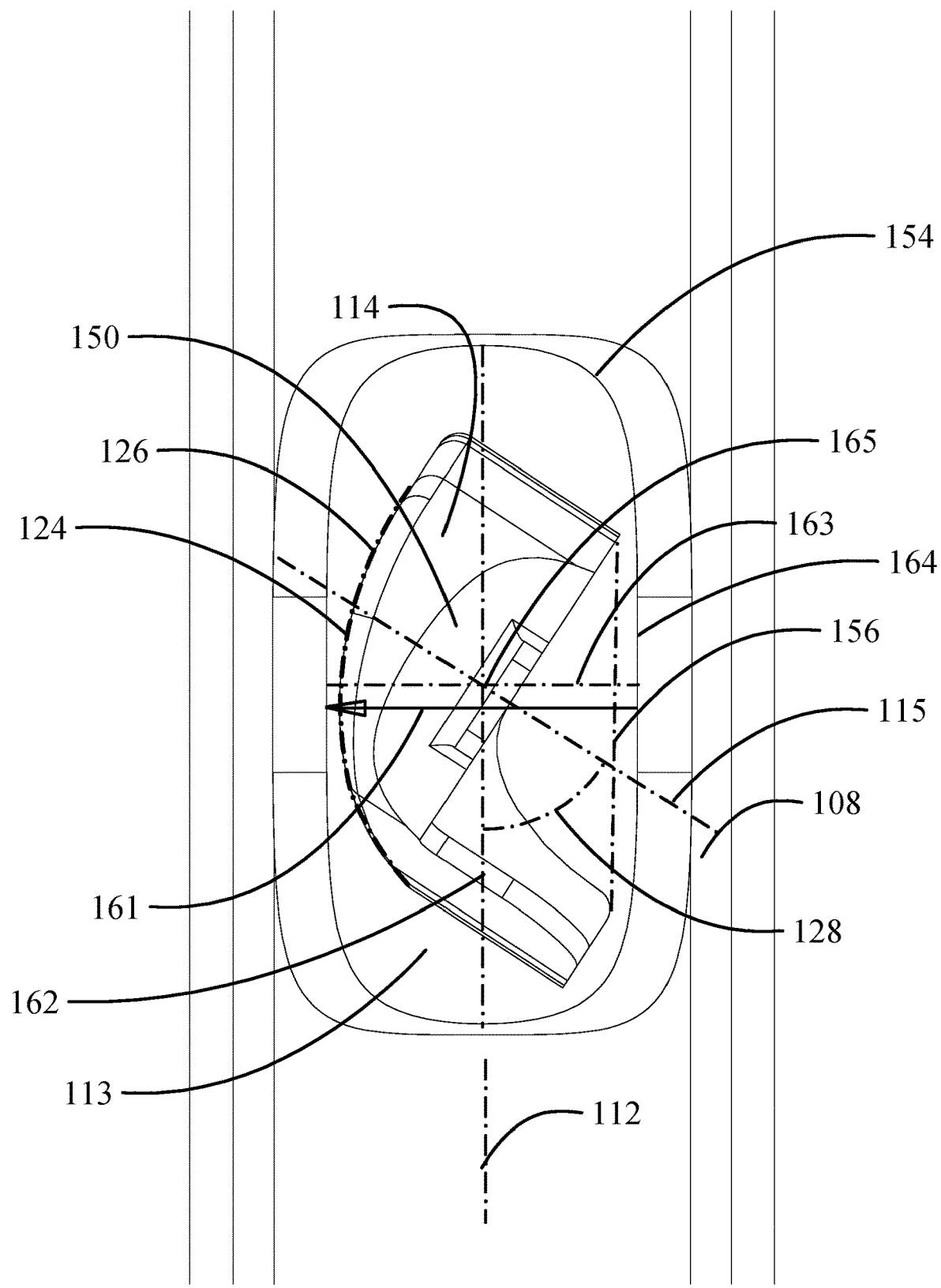
FIG. 10A is a top detailed view of an alternative implementation with a different aperture shape and the vent dam insert rotated for insertion.
Figure 10B:
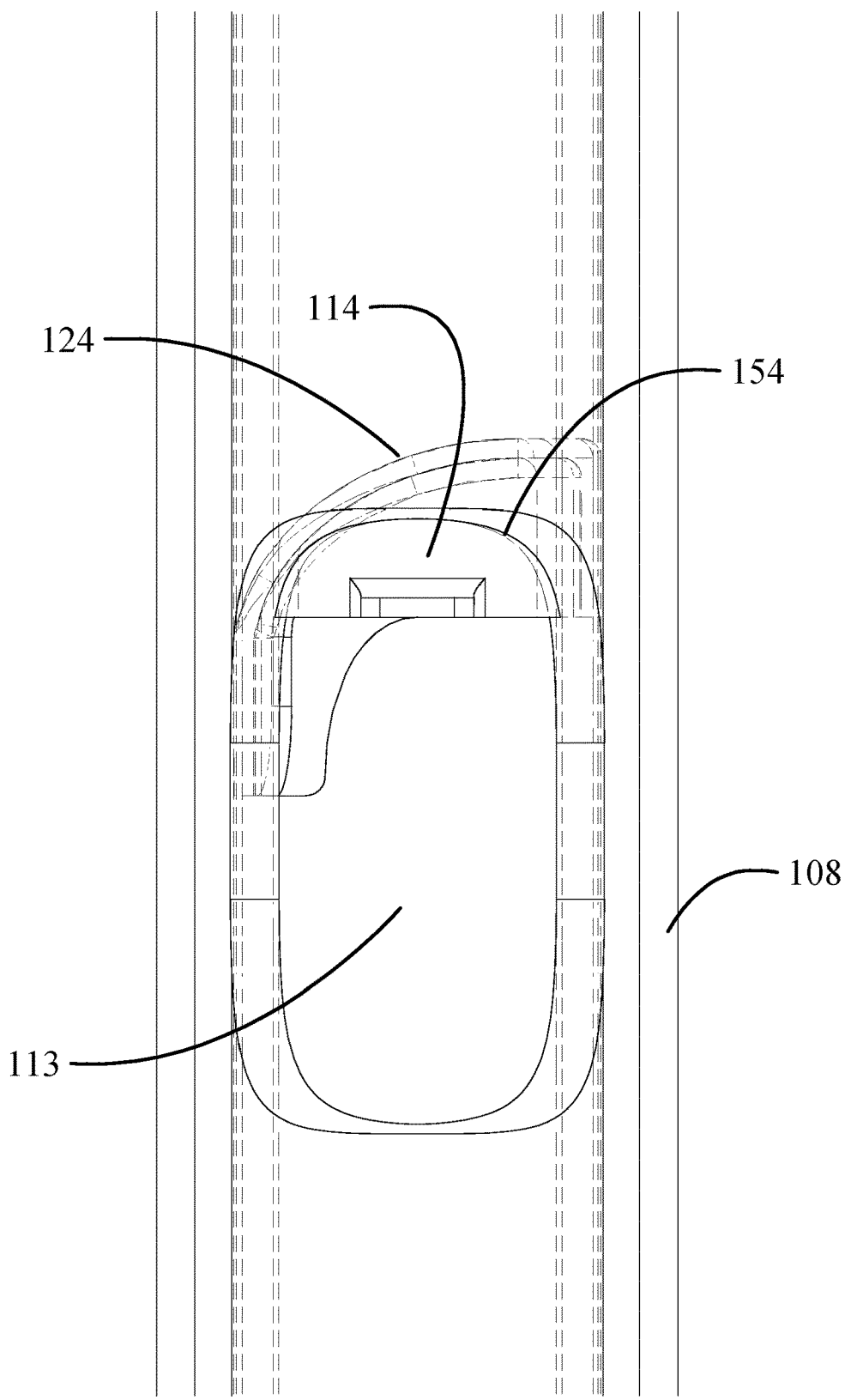
FIG. 10B is a top hidden line view of the alternative implementation with the vent dam insert translated into the seated position.

FIGS. 10A and 10B show an alternative implementation of the vent dam insert 114 in a stringer 108 having a differently shaped aperture 113. The variation of curvature of the curved wall from the first example implementation allowable based on the shape of the aperture 113 is shown. However, the longitudinally offset lateral flanges 116 and 118 are maintained. As in the first implementation, the perpendicular distance from the connecting line 156 to the curvature 126 of the curved wall 124 remains less than the clearing distance 161 to the peripheral edge 164 of the aperture 113 along the entire length of connecting line 156. With the normal axis 30 of the insert substantially at a center 165 of the aperture the insert 114 is received into the aperture when rotated to the insertion angle 128 and then rotated into sealing engagement with the insert longitudinal axis 115 parallel to the duct longitudinal axis 112 and translated to an end periphery 154 of the aperture. As in the first example implementation a positioning ledge 150 is employed.

Figure 11:
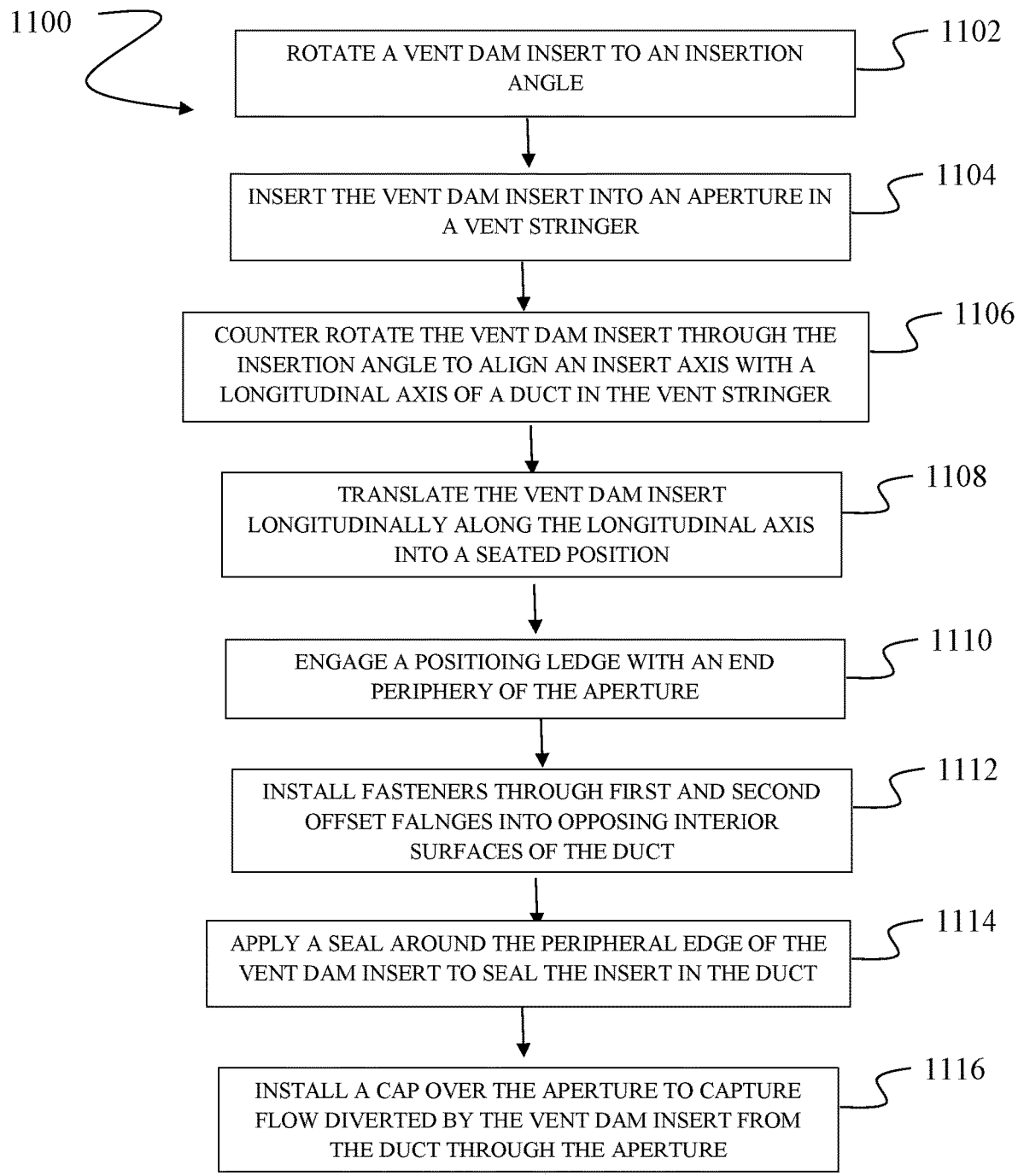
FIG. 11 is a flow chart for a method for sealing a vent stringer duct employing the disclosed implementations.

A method 1100 for sealing a vent stringer employing the implementations described herein is shown in FIG. 11. A vent dam insert is rotated to an insertion angle, step 1102. The vent dam insert is inserted into an aperture in a vent stringer, step 1104. The vent dam insert is counter rotated through the insertion angle to align an insert axis with a longitudinal axis of a duct in the vent stringer step 1106. The vent dam insert is then translated longitudinally along the longitudinal axis into a seated position by sliding the vent dam insert in the duct, step 1108. As a portion of seating the vent dam insert, a positioning ledge is engaged with an end periphery of the aperture, step 1110. Fasteners may be installed through first and second offset flanges of the vent dam insert into opposing interior surfaces of the duct, step 1112 A seal is applied around the peripheral edge of the vent dam insert to seal the insert in the duct in the vent stringer, step 1114. A cap is installed over the aperture, step 1116, to capture flow diverted by the vent dam insert from the duct through the aperture.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims. Within the specification and the claims the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard", "upper" and "lower", "forward" and "aft" or "rearward", "leading" and "trailing", and "right" and "left" are employed to describe relative positioning and other than for the specific implementations disclosed may be substituted with appropriate descriptors such as "first" and "second", "top" and "bottom" or "right" and "left", and "clockwise" and "counterclockwise" may be reversed depending on orientation of actual implementation.

What is claimed is:

1. A dam to divert flow in a duct having a longitudinal axis, opposing interior lateral surfaces and an aperture, the dam comprising:
   a single piece insert having a first lateral flange and a second lateral flange, the first lateral flange and second lateral flange parallel to a longitudinal axis of the insert and configured to engage the opposing interior lateral surfaces of the duct in a seated position, the insert engaging the duct in sealing contact in the seated position, the first and second lateral flanges offset longitudinally along the longitudinal axis of the insert and joined with a curved wall having a curvature shaped to be received through the aperture in the duct with the insert rotated about a normal axis perpendicular to the longitudinal axis of the duct to a rotated position oriented at an insertion angle between the longitudinal axis of the insert and the longitudinal axis of the duct, wherein a trailing edge of the first lateral flange and a leading edge of the second lateral flange are oriented on a lateral hypotenuse of a triangle having a first segment extending from the trailing edge of the first lateral flange parallel to the first lateral flange and a line extending from the leading edge of the second lateral flange to the first segment perpendicular to the first lateral flange and second lateral flange, a component of said lateral hypotenuse perpendicular to the longitudinal axis of the insert having a planar length less than a planar width between the opposing interior lateral surfaces at the aperture.

2. The dam as defined in claim 1 wherein the lateral hypotenuse has a relative angle to the first and second lateral flange of not less than 90°.

3. The dam as defined in claim 1 wherein the single piece insert has a trapezoidal cross section.

4. The dam as defined in claim 1 wherein a perpendicular distance from a connecting line, extending from the leading edge of the second lateral flange to a forward termination of the first lateral flange, to the curvature of the curved wall is less than a clearing distance perpendicular from a major axis of the aperture to a peripheral edge of the aperture at a center of the aperture.

5. The dam as defined in claim 1 wherein the curvature is asymmetric.

6. The dam as defined in claim 1 further comprising a positioning ledge on a top surface of the insert, said positioning ledge having an edge configured to engage an end periphery 54 the aperture.

7. The dam as defined in claim 6 further comprising a tab extending from the positioning ledge.

8. A fuel vent system for an aircraft, the system comprising:
    a vent stringer having a duct with a curved trapezoidal cross section, a longitudinal axis and opposing first and second interior lateral surfaces; and
    a dam comprising a single piece insert having a first lateral flange and a second lateral flange parallel to a longitudinal axis of the insert and configured to engage opposing the first and second interior lateral surfaces of the duct with the longitudinal axis of the insert aligned with the longitudinal axis of the duct in a seated position of the insert, the first and second lateral flanges offset longitudinally along the longitudinal axis of the insert and joined with a curved wall having a curvature shaped to be received in an aperture in the vent stringer with the insert oriented in a rotated position at an insertion angle between the longitudinal axis of the insert and the longitudinal axis of the duct, wherein a trailing edge of the first lateral flange and a leading edge of the second lateral flange are oriented on a lateral hypotenuse of a triangle having a first segment extending from the trailing edge of the first lateral flange parallel to the first lateral flange and a line extending from the leading edge of the second lateral flange to the first segment perpendicular to the first lateral flange and second lateral flange, a component of said lateral hypotenuse perpendicular to a longitudinal axis of the insert having a planar length less than a planar width between the first and second interior lateral surfaces the aperture.

9. The fuel vent system as defined in claim 8 wherein the vent stringer has an arcuate trapezoidal cross section with a flat bottom and the first and second interior lateral surfaces extend from the flat bottom to a curved top having a chord length less than a bottom width.

10. The fuel vent system as defined in claim 8 wherein a cross sectional periphery of the insert is in sealing contact with an internal periphery of the duct in the seated position.

11. The fuel vent system as defined in claim 8 further comprising a positioning ledge on a top surface of the insert, said positioning ledge having an edge configured to engage an end periphery of the aperture.

12. The fuel vent system as defined in claim 8 further comprising a first fastener inserted through the first lateral flange and the first interior lateral surface and a second fastener inserted through the second lateral flange and the second interior lateral surface.

13. The fuel vent system as defined in claim 8 further comprising a fillet seal around a forward peripheral edge of the insert.

14. The fuel vent system as defined in claim 9 wherein the aperture is elliptical and has a minor axis shorter than the bottom width of the duct.

15. The fuel vent system as defined in claim 8 wherein a perpendicular distance from a connecting line, extending from the leading edge of the second lateral flange to a forward termination of the first lateral flange, to the curvature of the curved wall is less than a clearing distance perpendicular from a major axis of the aperture to a peripheral edge of the aperture about a center of the aperture, allowing insertion of the insert into the aperture in the rotated position.

16. The fuel vent system as defined in claim 8 wherein the curvature is composed of a plurality of segments limited in extent to be received within the duct, the segments comprising:
    a first segment not exceeding an extrapolation of the first lateral flange beyond trailing edge to a tangent of a second segment, said second segment limited by a semicircle of a radius equal to or less than the planar width and commencing perpendicular to the longitudinal axis, the semicircle of the second segment extending over an arc equal to or greater than the insertion angle having a termination at a tangent point to the second interior lateral surface; and
    a third segment extending from the termination of the second segment to an extrapolation of the second lateral flange to an intersection point, wherein the third segment is parallel to the lateral surface of the duct.

17. A method for sealing a vent stringer, the method comprising:
    rotating a single piece vent dam insert having a first lateral flange and a second lateral flange, the first lateral flange and second lateral flange parallel to a longitudinal axis of the insert to an insertion angle;
    inserting the vent dam insert into an aperture in a vent stringer having a duct with a longitudinal axis, opposing lateral interior surfaces and a longitudinal axis, wherein the first and second lateral flanges are offset longitudinally along the longitudinal axis of the insert and joined with a curved wall having a curvature shaped to be received through the aperture in the duct with the insert rotated about a normal axis perpendicular to the longitudinal axis of the duct to a rotated position oriented at the insertion angle between the longitudinal axis of the insert and the longitudinal axis of the duct, and wherein a trailing edge of the first lateral flange and a leading edge of the second lateral flange are oriented on a lateral hypotenuse of a triangle having a first segment extending from the trailing edge of the first lateral flange parallel to the first lateral flange and a line extending from the leading edge of the second lateral flange to the first segment perpendicular to the first lateral flange and second lateral flange, a component of said lateral hypotenuse perpendicular to the longitudinal axis of the insert having a planar length less than a planar width between the opposing interior lateral surfaces;

rotating the vent dam insert to align the longitudinal axis of the vent dam insert with the longitudinal axis of the duct in the vent stringer; and sliding the vent dam insert longitudinally along the longitudinal axis into a seated position in the duct.

18. The method of claim 17 further comprising engaging a positioning ledge with an end periphery of the aperture.

19. The method of claim 17 further comprising inserting a first fastener through a first offset flange into a first opposing interior lateral surface of the duct and inserting a second fastener through a second offset flange into a second opposing interior lateral surface.

20. The method of claim 17 further comprising applying a seal around a peripheral edge of the vent dam insert to seal the insert in the duct in the vent stringer.

\* \* \* \* \*